United States Patent
Saho et al.

(10) Patent No.: US 7,410,573 B2
(45) Date of Patent: Aug. 12, 2008

(54) WASTE WATER PURIFICATION APPARATUS AND WASTE WATER PURIFICATION METHOD INCLUDING THE REGENERATION OF USED COAGULANT

(75) Inventors: Norihide Saho, Tsuchiura (JP); Hisashi Isogami, Tsuchiura (JP); Katsuhiko Asano, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 519 days.

(21) Appl. No.: 10/518,903

(22) PCT Filed: Jun. 25, 2003

(86) PCT No.: PCT/JP03/08049
§ 371 (c)(1),
(2), (4) Date: Dec. 23, 2004

(87) PCT Pub. No.: WO2004/002900
PCT Pub. Date: Jan. 8, 2004

(65) Prior Publication Data
US 2005/0230299 A1    Oct. 20, 2005

(30) Foreign Application Priority Data
Jun. 26, 2002   (JP) ............................. 2002-185437

(51) Int. Cl.
*C02F 1/00*    (2006.01)
*C02F 1/48*    (2006.01)
*C02F 1/52*    (2006.01)

(52) U.S. Cl. .................. 210/206; 210/223; 210/259; 210/512.1; 209/3; 209/213

(58) Field of Classification Search ............ 210/206, 210/223, 259, 512.1; 209/3, 213
See application file for complete search history.

(56) References Cited

U.S. PATENT DOCUMENTS 5,674,402 A   10/1997   Nilsson et al.
5,944,986 A    8/1999   Saho et al.

FOREIGN PATENT DOCUMENTS

| JP | 8-024515 | 1/1996 |
|----|----------|--------|
| JP | 2002-066375 | 3/2002 |
| JP | 2003-112180 | 4/2003 |
| JP | 2003112180 A * | 4/2003 |
| WO | WO 94/00394 | 1/1994 |
| WO | WO 2004/002900 | 1/2004 |

OTHER PUBLICATIONS

Machine Translation of JP 2003112180 A.*

* cited by examiner

*Primary Examiner*—David A Reifsnyder
(74) *Attorney, Agent, or Firm*—Antonelli, Terry, Stout & Kraus, LLP.

(57) ABSTRACT

A waste water purification system for purifying polluted salt water including oil and the like by coagulating and separating pollutant matter in the polluted salt water can regenerate and reuse a coagulant in the system while scarcely resupplying the coagulant, an acid solution and an alkaline solution. The acid and alkaline solutions are required for disintegrating coagulated flocs from the polluted salt water and regenerating the coagulant from sludge. Alkaline water enriched in sodium hydroxide and an acidic aqueous solution containing hydrochloric acid and the like are generated by electrolyzing the purified salt water. The flocs in the separated sludge are disintegrated by use of the alkaline water, pollutant matter is removed from the disintegrated aqueous solution, and the strong acidic containing the hydrochloric acid is added to the aqueous solution removed of the pollutant matter to have the coagulant. The coagulant can be thus regenerated from the recovered sludge.

4 Claims, 7 Drawing Sheets

WASTE WATER PURIFICATION APPARATUS AND WASTE WATER PURIFICATION METHOD INCLUDING THE REGENERATION OF USED COAGULANT

TECHNICAL FIELD

The present invention relates to a waste water purification apparatus and an operation method therefor, which can reuse coagulants in a recycling manner and can dispose of recovered sludge satisfactorily.

BACKGROUND ART

Existing apparatuses for purification of polluted water, for example, include purification apparatuses and operation methods in which for the purpose of filtering separation of pollutant particles of a few μm or more in particle size or separating them according to specific gravity differences, a coagulant capable of supplying aluminum ion or iron ion is added to the polluted water as pretreatment for separation treatment, so that the pollutant particles are collected in the flocs whose matrixes are aluminum hydroxide and iron hydroxide, to form large and dense pollutant particle clumps of a few hundreds to a few thousands μm in particle size such that polluted water is purified through separation based on filtration or specific gravity difference.

Also, included are purification apparatuses and operation methods in which a magnetic powder is added contemporarily with a coagulant to form the magnetic flocs, and the magnetic flocs are trapped and separated by exerting magnetic force, so that polluted waster is purified. In this type of purification apparatuses and operation methods, the metal ion in the added coagulant is collected in the separated flocs or magnetic flocs in the form of hydroxide, and the flocs are dehydrated with a centrifugal separator or a belt press machine and then subjected to incineration disposal, discard disposal, or composting disposal.

Accordingly, conventional purification apparatuses and operation methods require continuous addition of coagulants as expendables in every operation.

However, the coagulants are expensive, thereby causing increase in operation cost, and furthermore, the operators have to convey and resupply the coagulant at regular intervals which poses a problem that the operation cost is increased by the personnel cost to be increased accordingly.

Thus, in order to improve the efficiency in such a purification apparatus and an operation method, as disclosed in JP-A-8-24515, the separated matter obtained by coagulation and separation is first added with a strongly acidic aqueous solution such as sulfuric acid, so that flocs or magnetic flocs are made to be situated in a strongly acidic solution falling in the non-coagulation condition range, and the flocs are thereby disintegrated. Addition of a strongly acidic aqueous solution such as sulfuric acid to this solution elutes the ions of such metals as aluminum from the metal hydroxides, forming an aqueous solution of aluminum sulfate. The solution itself thus obtained is a coagulant, and can be reused as a coagulant.

Further, under this condition, the pollutant particles and magnetic powder are eliminated from the flocs, and the magnetic powder can be magnetically separated by applying the magnetic force of a magnet, recovered, and reused.

Furthermore, the concentration of the pollutant particles can further be increased by sedimentation, filtering separation with a membrane and the like, and furthermore, by removal based on separation.

On the other hand, when the magnetic field is made extremely high by use of a superconductor magnet based on a super conductor bulk magnet or a coil type superconductor magnet as a magnet used for magnetic separation, if the iron based coagulant is used instead of a magnetic powder to form flocs on the basis of iron hydroxide, namely, the flocs are formed with weakly magnetic iron hydroxide, the flocs can be magnetically separated without the use of the magnetic powder. In this case, accordingly a magnetic powder is not used, and hence no facilities for supplying a magnetic powder and recovering the magnetic powder from the sludge are needed.

In the above described treatment method, in order to regenerate coagulants an acid agent or an alkali agent is needed to be continuously added as expendable, and hence there has occurred a problem that the operation cost is increased by the cost defrayed for these two types of reagents and by the personnel cost defrayed for the labor of the periodic supply of these two types of reagents.

Further, in the case where the pollutant is crude oil, there occurs a problem that the floc disintegration by acid or alkali treatment alone allows the pollutant to remain mixed in the sludge so that the pollutant cannot be separated the from the sludge, and the regenerated coagulant is made to be mixed with the crude oil so that the coagulant cannot work as a satisfactory coagulant.

Furthermore, in the case where a purification apparatus is used on the sea-based platform for an offshore oil field, there occurs a problem that the periodic supply of the coagulant requires the transportation by a helicopter or a devoted ship, which is accompanied by a high transportation cost and a high unloading cost, thus resulting in an increase of the purification operation cost.

Moreover, in the case where are removed the pollutant matters such as the oil in the ballast water (For establishing the balance of a ship after unloading, sea water is filled in the vacant space in the ship, and the sea water is discharged into the sea immediately before loading.) in a crude oil tanker, a natural gas carrying vessel, an ore carrying vessel, or the like, and the bacteria, plankton and the like in the loaded sea water, periodic resupply of coagulants requires the purchase of chemicals at the anchoring sites, and is accompanied with a problem that the chemicals to be used are not easily obtainable depending on the anchoring sites. Further, there occurs a problem that harmful plankton in the separated or removed/recovered sludge cannot be disinfected as the sludge remain separated so that the sludge is needed to be disinfected. Further, in the case where a volume reduction apparatus is needed to be installed for the recovered sludge, the installation space has to be secured, with an accompanying problem of acquiring the space aboard.

DISCLOSURE OF INVENTION

An object of the present invention is to provide a purification apparatus and an operation method therefor, which can regenerate and reuse the coagulant without resupplying the full quantity of an acid/alkali solution, and to provide a purification apparatus and an operation method therefor, which can recover oil from the recovered sludge and disinfect the pollutant matters.

The above described object is achieved by a waste water purification system including a waste water purification apparatus which comprises purification means for purifying the polluted water containing particulate floating particles such as plankton, oil particles and organic matters to be removed and the polluted water of factory effluent containing pollutant particles, phosphorus and the like to be removed that are generated from industrial sites, means for recovering sludge that is generated in the above described purification treatment, and means for discharging the purified water generated in the above described purification treatment. The purification means and the means for recovering sludge comprise coagulation and separation means for forming flocs containing pollutant particles, phosphorus and the like by infusing coagulants, and for separating the flocs to generate purified water, means for disintegrating the flocs collected as sludge by using the acidic solution and alkaline solution generated by electrolyzing the liquid, means for coagulant regeneration that extracts and separates the coagulant in such a way that the device regenerates the coagulant from the substances forming the above described flocs and separates the coagulant from the matters to be removed in the raw water, and sludge recovering and discarding means for recovering and discarding the above described matters to be removed.

Also, the above described object is achieved by the waste water purification system in which the above described purification apparatus comprises chemicals-free filtering means for physically filtering the above described polluted water on the basis of a chemicals-free treatment, and coagulation and separation means for separating the flocs which are formed to contain pollutant particles, phosphorus and the like by infusing a coagulant.

Further, the above described object is achieved by the waste water purification system in which the above described purification apparatus comprises chemicals-free filtering means for physically filtering the above described polluted water on the basis of a chemicals-free treatment and coagulation and separation means for separating the above described magnetic flocs which are formed to contain pollutant particles, phosphorus and the like by infusing a coagulant and a magnetic material, and thus magnetically separates and collects the above described magnetic flocs as sludge.

Further, the above described object is achieved by the waste water purification system in which the above described liquid is sea water.

Furthermore, the above described object is achieved by the waste water purification system in which the above described liquid is soft water added with salt.

Moreover, the above described object is achieved by the waste water purification system in which the above described purification apparatus comprises chemicals-free filtering means for physically filtering the above described polluted water on the basis of a chemicals-free treatment, and coagulation and separation means for separating the above described magnetic flocs which are formed to contain pollutant particles, phosphorus and the like by infusing a coagulant and a magnetic material, thus magnetically separates and collects the above described magnetic flocs as sludge, disintegrates the above described magnetic flocs, and then recovers the magnetic material.

Additionally, the above described object is achieved by the waste water purification system in which the sludge, discharged from the sludge recovering and discarding means that recovers and discards the above described matters to be removed, is introduced into a domestic waste water purification means that treats the domestic sludge generated from human domestic waste water including sewage.

Further, the above described object is achieved by the waste water purification system in which the above described waste water purification apparatus further comprises means for centrifugal separation of floating particles that centrifugally separates and recovers floating particles after disintegrating the above described flocs.

Further, the above described object is achieved by a waste water purification system that is arranged in a ship.

Further, the above described object is achieved by the waste water purification system that is arranged in a ship and purifies under sail the ballast water in the ship.

Furthermore, the above described object is achieved by the waste water purification system in which the above described waste water purification apparatus comprises floc disintegration means for disintegrating the above described flocs collected as sludge by use of the acidic solution and/or the alkaline solution generated by electrolyzing sea water or by use of the acidic solution and/or the alkaline solution generated by electrolyzing the soft water obtained by membrane treatment of soft water or sea water, produces alkaline water enriched in sodium hydroxide as well as in the hydroxide ion in sea water by electrolyzing sea water to collect the sodium ions around the cathode, and making membrane separation of the above described sea water.

Moreover, the above described object is achieved by the waste water purification system that is arranged on a sea-based platform and purifies on the platform the waste water created on the platform.

Also, the above described object is achieved by a waste water purification system including a waste water purification apparatus in which the waste water purification apparatus comprises purification means for making purification treatment of the polluted water containing the floating particles including plankton, oil particles, organic matters and the like all to be removed and the polluted water of factory effluent containing pollutant particles, phosphorus and the like all to be removed and generated from industrial sites, sludge recovery means for separating and collecting the sludge, generated by the above described purification treatment, from the waste water, and means for discharging the purified water generated by the above described purification treatment. The above described purification means and the above described sludge recovery means comprise coagulation and separation means for forming flocs containing pollutant particles, phosphorus and the like by infusing a coagulant and creates purified water by separating the above described flocs, floc disintegrating means for disintegrating the above described flocs collected as sludge by using the acidic solution and/or the alkaline solution generated by electrolyzing the liquid, coagulant regeneration means for regenerating the coagulant from the matter forming the above described flocs and separating the coagulant from the matter to be removed in the raw water to extract and separate the coagulant, fresh coagulant supply means for supplying fresh coagulant in a parallel manner when coagulant is deficient, and sludge recovery and discard device for recovering and discarding the above described matter to be removed.

Other objects, features and advantages of the invention will become apparent from the following description of the embodiments of the invention taken in conjunction with the accompanying drawings.

MODES FOR CARRYING OUT THE INVENTION

Figure 1:
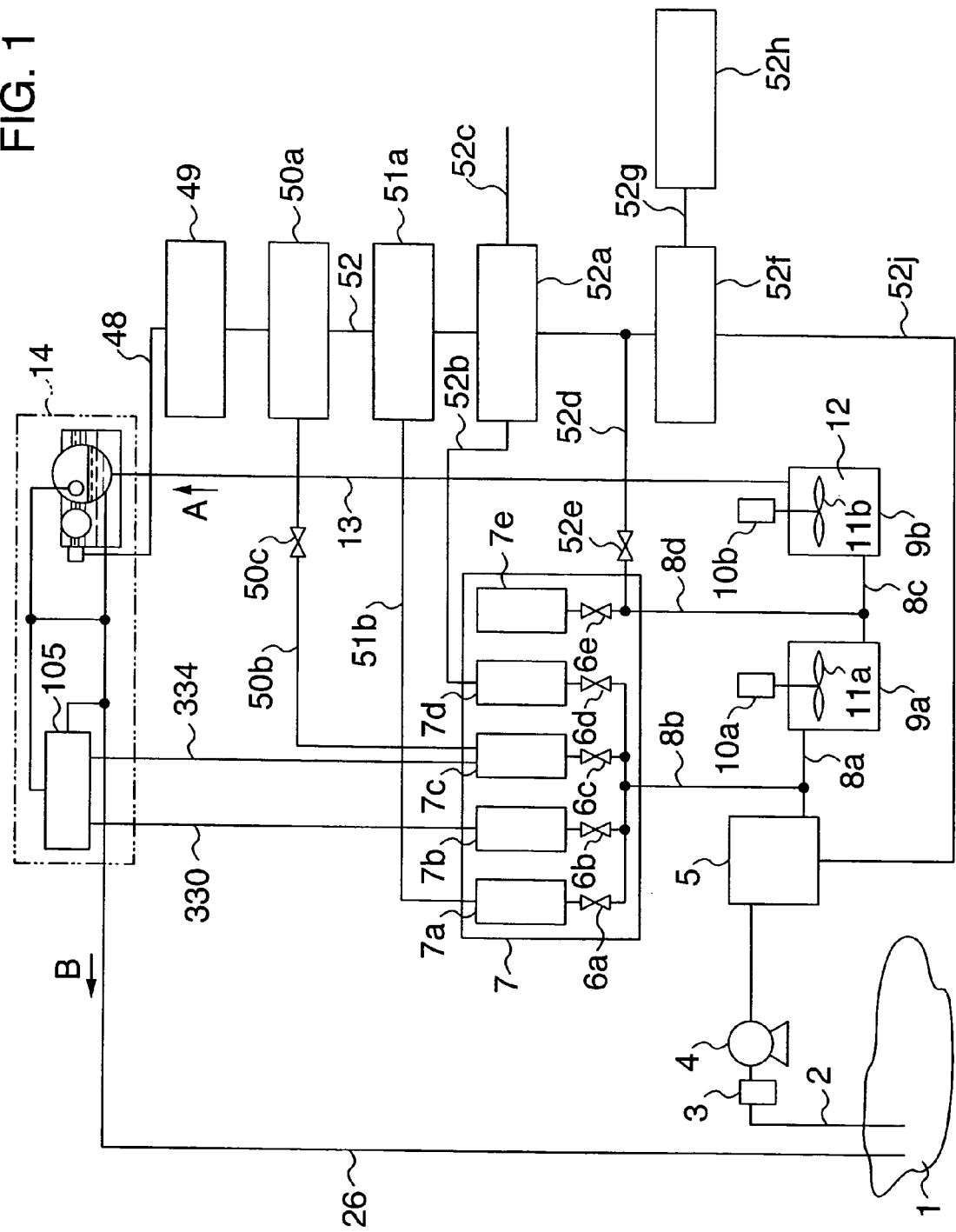
FIG. 1 is a flow diagram showing the waste water purification system according to an embodiment of the present invention.
Figure 2:
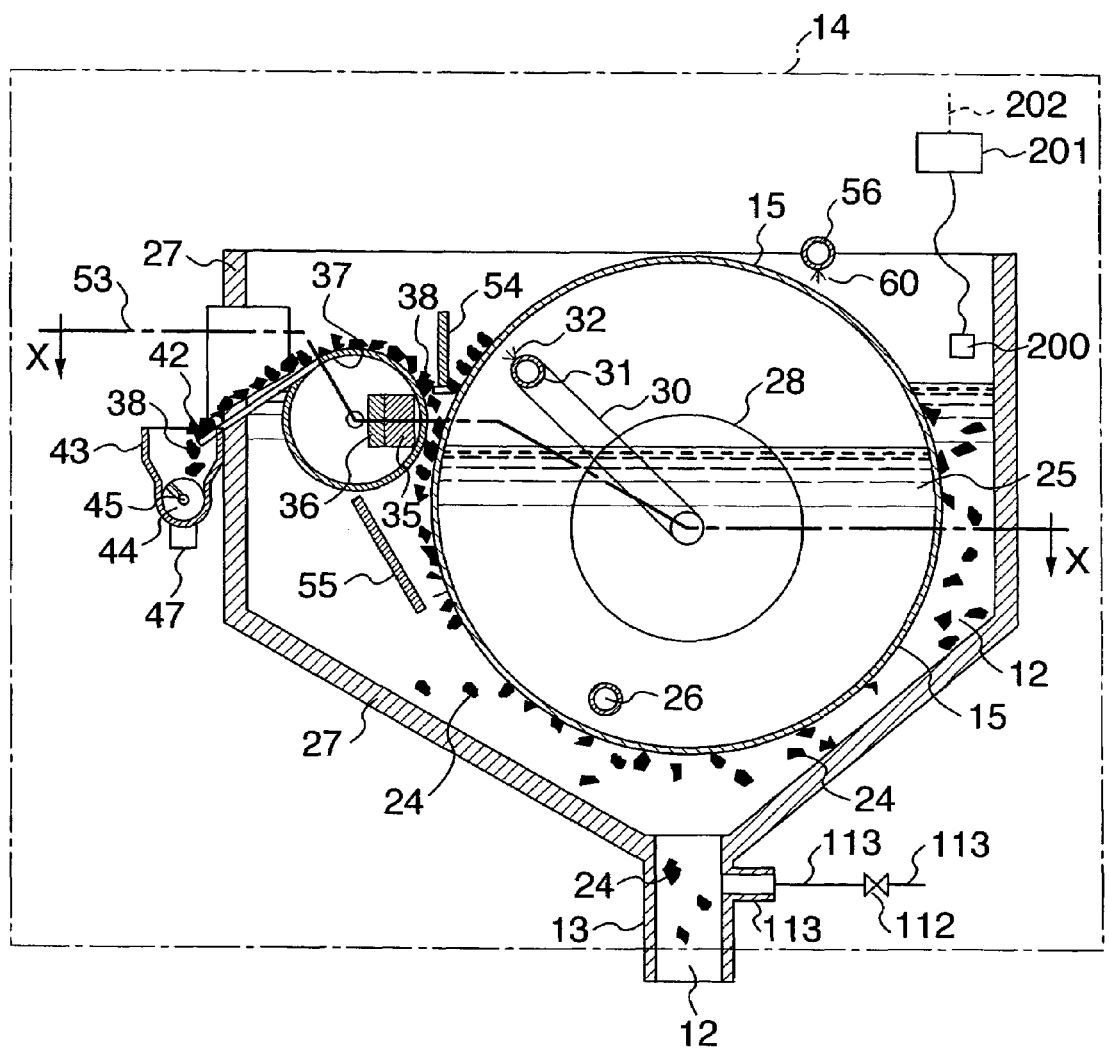
FIG. 2 is a sectional view of a waste water purification apparatus in the embodiment according to the invention.
Figure 3:
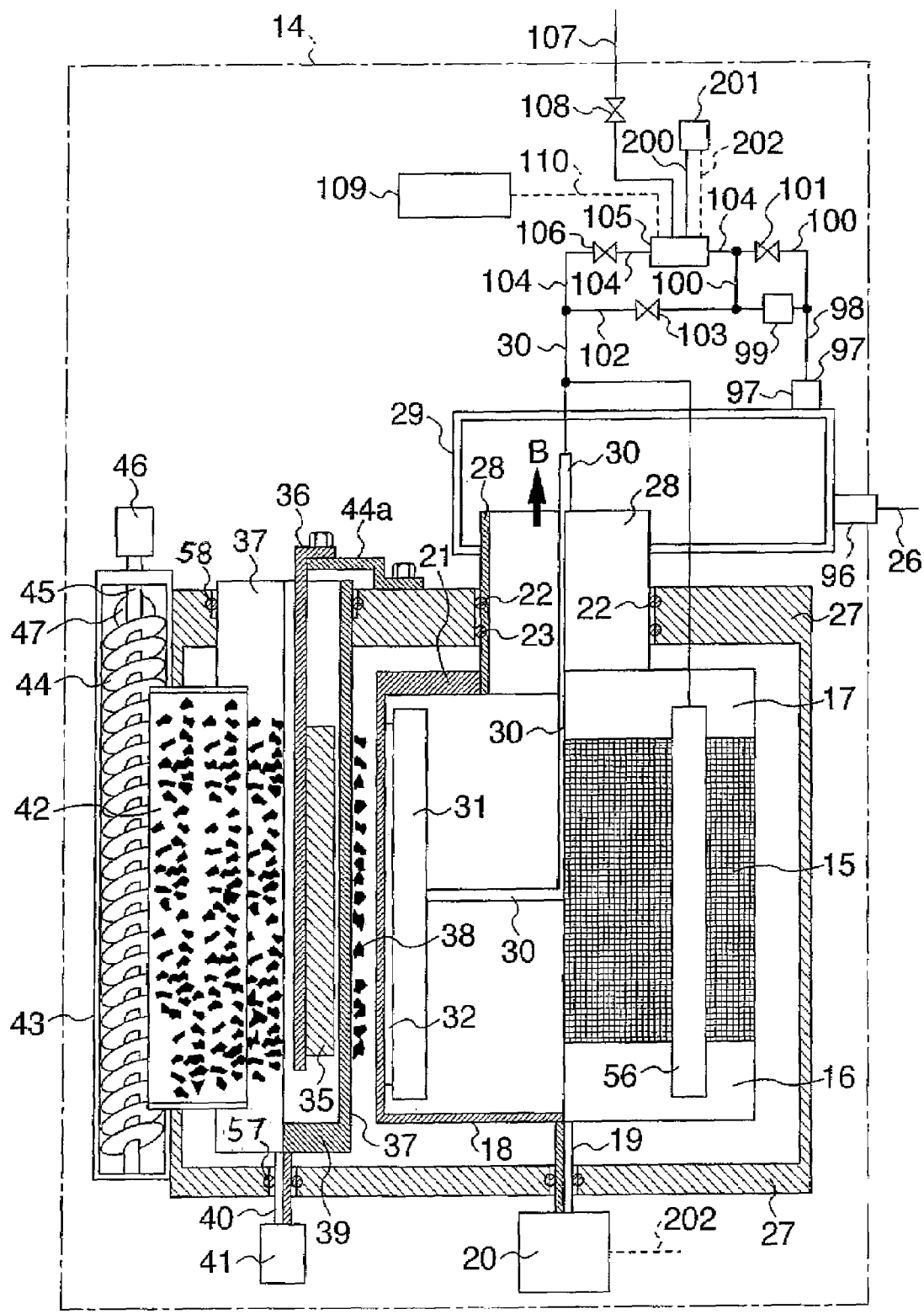
FIG. 3 is an X-X section view of the waste water purification apparatus in the embodiment, shown in FIG. 2, according to the invention.

An embodiment of the invention will be described below with reference to FIGS. 1 to 3. FIG. 1 is a flow diagram of a waste water purification system in which the invention has been incorporated. FIG. 2 is an enlarged sectional view of the membrane separation apparatus shown in FIG. 1. FIG. 3 is a semi-sectional view of FIG. 2 as viewed from above.

In FIG. 1, the raw water of polluted sea water containing the pollutant matter including oil particles, bacteria, plankton, and organic matter particulates, all forming the matter to be removed, is drawn up into a raw water storage tank 5 from the sea 1 by use of a pump 4 through a duct 2 and a filter 3 for removing large pieces of trash. Into the raw water tank 5 are added a magnetic powder from a magnetic powder slurry tank 7a that supplies an magnetic powder of triiron tetraoxide slurry, a pH adjusting agent either from a sodium hydroxide aqueous solution tank 7b that supplies an alkaline pH adjusting agent containing sodium hydroxide or from a hydrochloric acid aqueous solution tank 7c that supplies an acidic pH adjusting agent containing hydrochloric acid, a coagulant from a coagulant tank 7d that supplies an aqueous solution of ferric chloride to be used as coagulant, and a coagulation aid from a polymer tank 7e, through a duct 8a respectively through the intermediary of flow regulating valves 6a, 6b, 6c, 6d and 6e, all the tanks being situated within a seeding agent adjustment apparatus 7.

The raw water added with these chemicals is subjected to rapid stirring with stirring blades 11a driven to rotate by a motor 10a of a rapid stirring tank 9a. Then, a polymer agent is added into a slow stirring tank 9b, through a flow regulating valve 6e and a duct 8d, from the polymer tank 7e that supplies the polymer agent reinforce the flocs generated with the aid of the coagulant, and is subjected to slow stirring with stirring blades 11b (driven to rotate by a motor 10b in the slow stirring tank 9b, to generate a pretreated water 12 that contains magnetic flocs ranging from a few hundreds microns to a few millimeters in size.

The pretreated water 12 thus generated is led into a purification apparatus 14 through a duct 13 as indicated by an arrow A.

Description will be made below on the construction of a membrane magnetic separation apparatus 14 with reference to FIGS. 2 and 3.

First, in FIG. 3, a mesh 15 is constructed in a drum-like shape, with stainless steel thin wire, copper thin wire, polyester fiber or the like, that forms a membrane having openings ranging from a few microns to a few tens microns in opening size, and both ends of the mesh 15 are jointed to shells 16, 17 that have no openings. One of the ends is jointed to a flange 18 in an integrated manner, and the center of the flange 18 is jointed to a rod 19. The rotation of the rod 19 driven by a motor 20 causes to rotate the flange 18, the shell 16, the drum-like mesh 15 and the shell 17.

The shell 17 and a fixed flange 21 are integrated into one watertight piece, a nozzle 28 integrated with the fixed flange 21, maintaining the watertightness with the aid of ring-shaped sliding bodies 22, 23 made of a polymer material small in sliding resistance, is supported by a casing 27, and the fixed flange 21 rotates without wobbling of the rotation axis.

In FIG. 2, the mesh 15 is placed inside the casing 27 of the water purification tank. The pretreated water 12 flows from the duct 13 into the outside of the mesh 15, and the pretreated water 12 passes through the mesh 15. At this time, magnetic flocs 24 in the pretreated water are trapped on the outer surface of the mesh 15, the water that passes through the mesh 15 and thereby separated from the magnetic flocs 24 becomes purified water 25 and comes down to and stored in a purified water tank 29 shown in FIG. 3 through the nozzle 28. The stored purified water 25 is released into a water reservoir 1 shown in FIG. 1 from a nozzle 96 shown in FIG. 3 through a pipe 26. The driving force that makes the pretreated water pass through the mesh 15 is the liquid level difference between the pretreated water 12 and the purified water 25.

On the other hand, the magnetic flocs 24 are filtered by water passing and thereby attached as deposited matter onto the outer surface of the mesh 15 rotating clockwise along the direction of the arrow shown in FIG. 2, migrating to the vicinity of the water surface. A part of the purified water 25 is led from a nozzle 97 via a duct 98 in the purified water tank 29 shown in FIG. 3 to a pump 99 and is used as washing water.

The pressurized washing water is subjected to washing water flow regulation with a flow regulating bypass valve 101 equipped at a midway position of a pipe 100 and a flow regulating valve 103 equipped at a midway position of a pipe 102, both shown in FIG. 3, and transferred from a pipe 30 to a shower pipe 31 shown in FIG. 2, and shower water 32 is sprayed from the holes of a shower pipe 31, along the direction from the inner surface to the outer surface of the mesh 15.

An electrolysis apparatus 105 is provided at a position branched from a midway position along a pipe 104 shown in FIG. 3, and a part of the purified water is led into the electrolysis apparatus 105. The inlet flow into the electrolysis apparatus 105 is regulated with a flow regulating valve 106 and the flow regulating valve 103.

Figure 4:
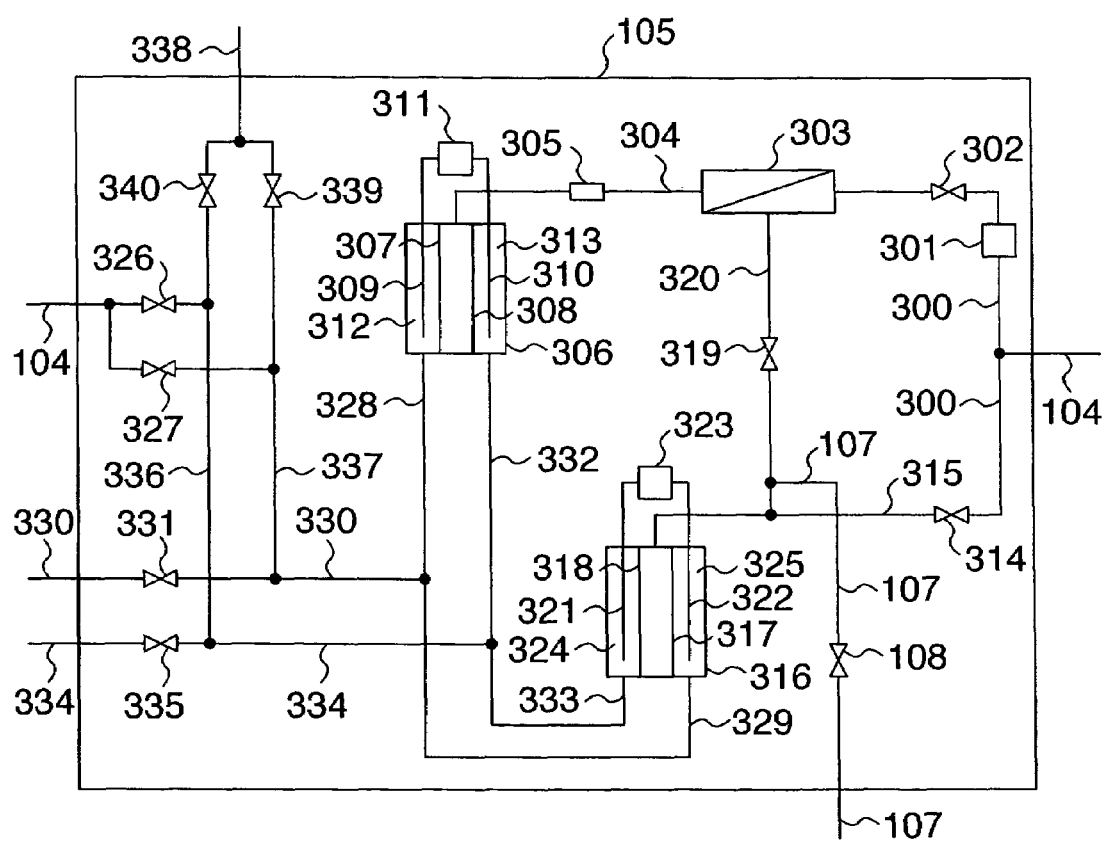
FIG. 4 is a flow diagram of an electrolysis device in the flow of the waste water purification apparatus in the embodiment, shown in FIG. 1, according to the invention.

FIG. 4 is a flow diagram of the electrolysis apparatus depicted in FIG. 1.

In FIG. 4, the purified water introduced into the electrolysis apparatus 105 is branched by a pipe 300, one flow of the branched flows is pressurized to the order of a few tens atm with a pump 301, and is led into a reverse osmosis membrane separator 303 through a flow regulating valve 302. Here, sodium (Na) ion and chloride (Cl) ion are filtered and the treated water becomes a soft water which is pressurized to a few atm with a pump 305 and led into an electrolysis tank 306 through a pipe 304.

In the electrolysis tank 306, the soft water is introduced into the space between diaphragms 307, 308 capable of passing ions, and electrolyzed by supplying electric current from an electric power supply 311 to a positive electrode 309 and a negative electrode 310. An alkaline aqueous solution enriched in OH ion is generated through the diaphragm 307 in a space 312 around the positive electrode 309, while on the other hand, a acidic aqueous solution enriched in H ion is generated in a space 313 around the negative electrode 310 through the diaphragm 308. Further, the soft water is sometimes used for preparation of chemicals including polymer agents.

On the other hand, the rest of the purified water introduced into the electrolysis apparatus 105 is branched by the pipe 300 and introduced into an electrolysis tank 316 through a flow regulating valve 314 and a pipe 315. In the electrolysis tank 316, the brine from the pipe 315 and the sea water high in salt concentration discharged from the reverse osmosis membrane separator 303 and introduced from a pipe 320 through a flow regulating valve 319 are introduced into the space between diaphragms 317, 318 capable of passing ions. Further, a sea water higher in salt concentration than the usual sea water flows in.

In the electrolysis tank 316, electrolysis is conducted by supplying electric current from an electric power supply 323 to a positive electrode 321 and a negative electrode 322. An aqueous solution enriched in Cl ion is generated through the diaphragm 318 in a space 324 around the positive electrode 321, while on the other hand, an aqueous solution enriched in Na ion is generated in a space 325 around the negative electrode 322 through the diaphragm 317.

The superfluous fraction of the highly concentrated sea water discharged from the reverse osmosis membrane separator 303 is discharged through a pipe 107 and a flow regulating valve 108 outside the electrolysis apparatus 105, for example, to the sea.

Incidentally, in the electrolysis apparatuses 306, 316, although not shown in the figure, a pipe for discharging the gas generated inside including hydrogen gas to the atmosphere is provided and a liquid level detecting device and an automatic valve are arranged so that the internal liquid level position is regulated.

The alkaline aqueous solution enriched in OH ion and generated in the space 312 passes through a pipe 328, the aqueous solution enriched in Na ion and generated in the space 325 passes through a pipe 329, and both solutions merge with each other in a pipe 330 to make a Na(OH) solution, which is supplied from the electrolysis apparatus 105, through a flow regulating valve 331 through a pipe 330 connected to the outside, to the sodium hydroxide aqueous solution tank 7b placed in the seeding agent adjustment apparatus 7.

On the other hand, the acidic aqueous solution enriched in H ion and generated in the space 313 passes through a pipe 332, the aqueous solution enriched in Cl ion generated in the space 324 passes through a pipe 333, and both solutions merge with each other in a pipe 334 to make a HCl solution, which is supplied from the electrolysis apparatus 105, through a flow regulating valve 335 through a pipe 334 connected to the outside, to the hydrochloric acid aqueous solution tank 7c placed in the seeding agent adjustment apparatus 7.

Superfluous fractions of the Na(OH) and HCl aqueous solutions are discharged from the electrolysis apparatus 105 to the outside through pipes 336, 337, 338 and flow regulating valves 339, 340. Both solutions are neutralized with each other to make a salt containing aqueous solution and discharged.

Further, a Na(OH) or HCl aqueous solution with predetermined pH value is made to flow in a pipe 104 from the pipe 336 or 337 through a flow regulating valve 326 or 327.

As shown in FIG. 3, this solution is supplied from the pipe 104 to the pipe 30 so that an alkaline water or an acidic water is mixed in the washing water. The deposited matter accumulated on the inner surface of the mesh 15 is exfoliated by the shower water 32 and the surface of the mesh 15 is renewed, the magnetic flocs 24 are made to go back to the water surface of the pretreatment water 12. Further, at the same time, the organic matter accumulated on the mesh 15 is washed with the alkaline water contained in the shower water 32, and the microbes including bacteria and the like sticking to the mesh 15 are disinfected by the action of the acidic water that is mixed intermittently, so that the proliferation of microbes is prevented on the mesh 15. Furthermore, the prevention of the proliferation of microbes leads to the prevention of the generation of mucous bodily fluids generated from the bodies of microbes, and hence trapping and fixing of the pollutant particles onto the mesh 15 ascribable to the bodily fluids can be prevented.

Here, the duct 30 shown in FIG. 3 is fixed to and supported by the casing 27 with the brackets (not shown in the figure).

As shown in FIG. 2, the magnetic flocs 24 exfoliated from the membrane are suspended in the vicinity of the water surface, and when the flocs 24 approach, for example, the magnetic generating means constituted with a permanent magnet 35 with a surface magnetic field strength of 0.5 Tesla and a supporting frame 36, the flocs 24 undergo rapid magnetic separation and migrate toward the permanent magnet 35 owing to the external magnetic field gradient formed by the permanent magnet 35. The magnetic flocs 38 that have migrated are attached to the surface of a thin-walled shell 37, made of nonmagnetic stainless steel or a plastic material, moving outside the magnetic field generating means.

As indicated by the arrow in FIG. 1, the magnetic flocs 38 attached onto the shell 37 rotating anticlockwise are exposed to the atmosphere. At this time, superfluous water in the magnetic flocs 38 is separated by gravitation, and flow down on the surface of the shell 37 or drip down so that the magnetic flocs 38 are concentrated in the moisture content to the order of 95%. The use of a coil type normal conduction magnet, a coil type superconducting magnet, a superconducting bulk magnet or the like, in place of the permanent magnet 35, yields similar effects.

As shown in FIG. 3, one end of the shell 37 is jointed to a flange 39, and a rod 40 jointed to the flange 39 is rotated by a motor 41. The rod 40 is supported by the casing 25, maintaining watertight with the aid of an O ring 57. The motor 41 is fixed to and supported by the casing 25. The other end of the shell 37 is rotatably supported by the casing 27, maintaining watertight with the aid of an O ring 58, and the interior of the shell 37 is open to the atmosphere. The permanent magnet 35 is fixed to and supported by, with the aid of the supporting frame 38, by the casing 25 with bolts or the like through the intermediary of a bracket 44a from the side of the atmosphere.

The construction described above permits easy arrangement of the magnetic field generating means from the outside. The motor 41 is fixed to and supported by the casing 25.

The concentrated magnetic flocs 38 on the surface of the shell 37 are moved by rotation and get away from the magnetic field generating means so that the magnetic attracting force becomes extremely weak, and hence the magnetic flocs are exfoliated from the surface of the shell 37 with a plane knife 42 as a tool for scratching off, and separated and collected as sludge into a sludge tank 43. The sludge in the sludge tank 43 is transferred upward in FIG. 2, with the aid of a set of collecting plates 44 arranged in the bottom of the sludge tank 43 and jointed to a rod 45 rotated by a motor 46, and discharged from an outlet 47. The discharged sludge is stored in a sludge tank 49 through a pipe 48 shown in FIG. 1. The sludge is transferred to a sludge decomposition tank 50a. In the sludge decomposition tank 50a, added is the acidic aqueous solution form the hydrochloric acid aqueous solution tank 7c through a pipe 50b and a flow regulating valve 50c.

When a prescribed acidity is attained, the flocs are disintegrated, and the hydroxide having formed the flocs is decomposed in such a way that iron hydroxide, for example, is decomposed into iron ion and hydroxide ion. At this time, the matters to be removed, namely, the magnetic powder, oil particles, plankton, bacteria and the like, all having been contained in the flocs, respectively remain in the sludge aqueous solution in a mixed but separated manner. Further, the plankton and bacteria are disinfected with the acidic water and thereby annihilated.

In FIG. 1, the sludge aqueous solution is transferred to a magnetic separation tank 51a, where the magnetic powder in the sludge aqueous solution is magnetically separated and recovered with a permanent magnet or the like, and then the sludge is recovered through a pipe 51b into the magnetic powder slurry tank 7a and reused.

The sludge aqueous solution that has been subjected to magnetic powder recovery is introduced into a liquid cyclone tank 52a, where the sludge aqueous solution is separated into oil, organic matter, plankton carcasses and the like. Here, the aqueous solution containing iron ion is recovered as coagulant, and transferred into the coagulant tank 7d through a pipe 52b. Further, the oil which is light in specific gravity is separated, and then discharged from a pipe 52c to be recovered. To the aqueous solution containing organic matter and plankton carcasses is added for neutralization a sodium hydroxide aqueous solution from the sodium hydroxide aqueous solution tank 7b through a pipe (not shown in the figure) and a flow regulating valve (not shown in the figure).

The aqueous solution is added polymer through a pipe 52d and a flow regulating valve 52e, and then concentrated with a centrifugal separator, a belt press machine or the like, installed in a dehydration apparatus 52f, and transferred into a high concentration sludge tank 52h through a pipe 52g. The separated clear supernatant liquid is discharged from a pipe 52j and returned to the raw water tank 5.

The sludge in the high concentration sludge tank 52h is stocked for transportation by truck to disposal sites or incineration sites, or transferred to a composting tank provided in a later stage of processing where the sludge is composted.

On completion of composting, the compost may be pulverized into powder and the magnetic powder and produced magnetic matter may be recovered for reuse with another magnet type magnetic separating device.

Also, in the case where the apparatus concerned is placed in a human residential space area, it is often provided with a sewage purification apparatus for treating human sewage, and the sludge in the high concentration sludge tank 52h can be led into the sewage purification apparatus (not shown in the figure) and made to reduce the volume thereof through decomposition by microbes.

On the other hand, in FIG. 2, side walls 53 are arranged on both sides of the knife 42 to prevent falling of the sludge inside the casing 27. The side walls 53 and the knife 42 are watertight against the casing 27, the edge of the knife 42 is pressed against the shell 37 with springs or the like (not shown in the figure). The edge of the knife 42 is made of a hard rubber.

A wall 54 is arranged which is made of a nonmagnetic material and fixed to and supported by the casing 27, for the purpose of preventing remoisturization of the magnetic flocs 38 caused by the splashing water flow of the shower water 32 on the surface of the casing 37.

Further, a wall 55 which is made of a nonmagnetic material and fixed to and supported by the casing 27, is arranged in the lower part of the shell 37 so that the magnetic flocs 38 exfoliated from the mesh 15 by applying the shower water 32 are not scattered away from the exfoliation location, but are made to suspend within the generated magnetic field, magnetically attracted and magnetically trapped on the surface of the shell 37.

Furthermore, a shower pipe 56 is arranged outside the mesh 15, and the outer surface of the mesh 15 is also washed with shower water 60 for recovery. The shower pipe 56 is branched from the pipe 30 and supplied with shower water. Thus, the outer surface of the mesh is washed and the clogging of the mesh can be prevented.

Moreover, as for the level of the pretreated water 12, the signal from a supersonic type level gauge 200 is subjected to signal processing and taken into a liquid level control apparatus 201; when the liquid level of the pretreated water 12 exceeds the predetermined level, the following control of the water level is performed: there is increased the number of revolutions of a motor 20 (depicted in FIG. 3) that is controlled in number of revolutions through an electric power line 202 so that the staying time of the mesh 15 in the pretreated water is reduced, the filtration treatment amount of the mesh 15 is increased, and the water level of the pretreated water 12 is thereby made to be lowered.

On the contrary, when the liquid level of the pretreated water 12 depressed below the predetermined level, the number of revolutions of the motor 20 is decreased so that the staying time of the mesh 15 in the pretreated water 12 is elongated, the filtration treatment amount of the mesh 15 is decreased, and the water level of the pretreated water 12 is thereby made to be raised.

In this connection, the operation generating the acidic water with the electrolysis apparatus 105 shown in FIG. 3 may be continuous, or intermittent or periodic on a timer or the like. Further, for the electric power source for electrolysis, a solar cell 109 or an electric power line 110 may be used; the electrolysis apparatus may be provided with a rechargeable battery (not shown in the figure), in which the power fed from the solar cell 109 is stored and discharged for electrolysis in rainy time.

Further, the hydrogen gas generated from the cathode of the electrolysis tank 105 is led into the solar cell 201 through a pipe 200, the hydrogen gas is allowed to react with the oxygen gas in the intake air to generate electric power, and the electric power is fed into the electrolysis apparatus 105 provided with electricity storage function through an electric line 202; accordingly, the hydrogen gas generated in the electrolysis tank 105 is effectively reused, leading to the effect that the electric power consumption of the electrolysis tank can be reduced, and furthermore, the no release of hydrogen gas outside the apparatus leads to the effect that the danger of hydrogen explosion can be prevented.

According to the above described embodiment, a part of the washing water that is sea raw water is lead into the electrolysis tank, where acidic water and alkaline water are generated by electrolysis; the magnetic flocs can be disintegrated by use of the acidic water so that the magnetic powder is recovered from the magnetic flocs to be reused, and furthermore, the metal ion containing water to make coagulant can be recovered which can be used as a coagulant when used in combination with the alkaline water. Further, resupply of magnetic powder and coagulant is scarcely needed, and the costs for chemicals and costs for transportation of chemicals are almost vanishing, leading to the effect that the operation cost can be reduced. Furthermore, the sludge is disintegrated and the magnetic powder and coagulant are recovered, which leads to the effect that the amount of generated sludge can be reduced. Additionally, the microbes in the sludge including bacteria can be disinfected by the acidic water, which leads to the effect that the proliferation of bacteria can be prevented even if the sludge is discharged into other oceans.

Further, the acidic water having disinfecting action is mixed in the washing water, and the water permeable filtering separation membrane is washed with the washing water continuously or at regular intervals; hence, the microbes including bacteria attached onto the mesh 15 is disinfected by the disinfecting action of the acidic water, the proliferation of microbes on the mesh 15 is prevented, and the clogging of the membrane is prevented, leading to the effect that the water permeability performance of the water permeable filtering separation membrane is not degraded.

Moreover, the alkaline water having the action preventing the attachment of the floating particles in the water is mixed in the washing water and the water permeable filtering separation membrane is washed with the washing water continuously or at regular intervals; hence, the clogging of the membrane is prevented, leading to the effect that the water permeability performance of the water permeable filtering separation membrane is not degraded.

Incidentally, in the embodiment, description has been made on the purification apparatus in which the membrane filtering separation and the magnetic separation are combined; however, in a purification apparatus comprising membrane filtering separation, a membrane can be generally applied to the purification apparatus for the purification, including the factory waste water purification and the sewage purification, that use tap water or a part of the purified water as the washing water for washing the membrane, also yielding similar effects.

Additionally, in the case where the raw water is soft water, continuous supply of the salt (NaCl) to the electrolysis tank permits the generation of the acidic water and alkaline water, the recovery of the coagulant from the magnetic flocs, and the reuse of the coagulant thus recovered.

Further, in the above described embodiment, description has been made on the case where a permanent magnet is applied for magnetic separation of the magnetic flocs; however, similar effects are obtained by use of a superconducting bulk magnet o a coil type superconducting magnet in place of the permanent magnet.

Figure 5:
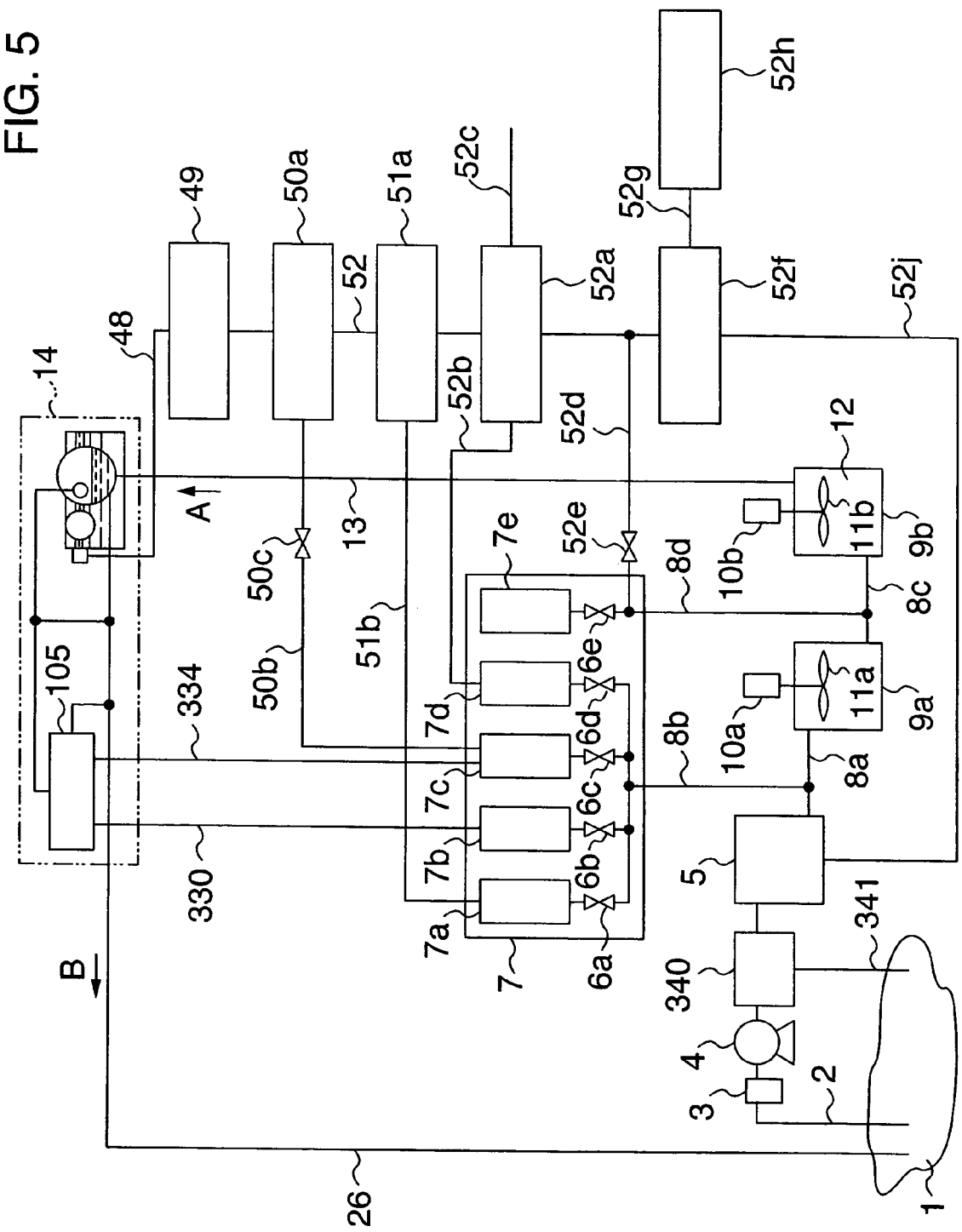
FIG. 5 is a flow diagram of a waste water purification apparatus according to another embodiment of the invention.

FIG. 5 illustrates another embodiment in accordance with the invention. FIG. 5 differs from FIG. 1 in that a device 340 for filtration with filter sheet is provided for the purpose of separating relatively large organisms, for example, daphnias that cannot be incorporated into flocs by use of a coagulant in water. Such organisms are filtered with the filter sheet of the order of a few hundreds microns in opening size in the device for filtration with filter sheet. The relatively large separated matters that have been washed with the filter washing water containing a part of the filtrate water are mixed in the waste washing water, and the waste washing water is made to reflow through a pipe 341 to the raw water body. The filtrate water, from which particles relatively large in size are removed by the device 340 for filtration with filter sheet, is made to flow in the raw water tank 5.

According to this embodiment, the large organisms that are not incorporated into the flocs, generated after addition of the coagulant, can be removed beforehand, and hence floating particles of a few hundreds microns or more in particle size can be removed beforehand, so that the consumption quantity of the coagulant can be reduced, leading to the effect that the operation cost can thereby be reduced. Additionally, the organisms that cannot be removed in the purification treatment are not discharged to the bodies of water other than that from which the raw water is taken, leading to the effect that the disturbance of the ecological systems, in the bodies of water other than the body of water from which the raw water is taken, can be prevented.

Figure 6:
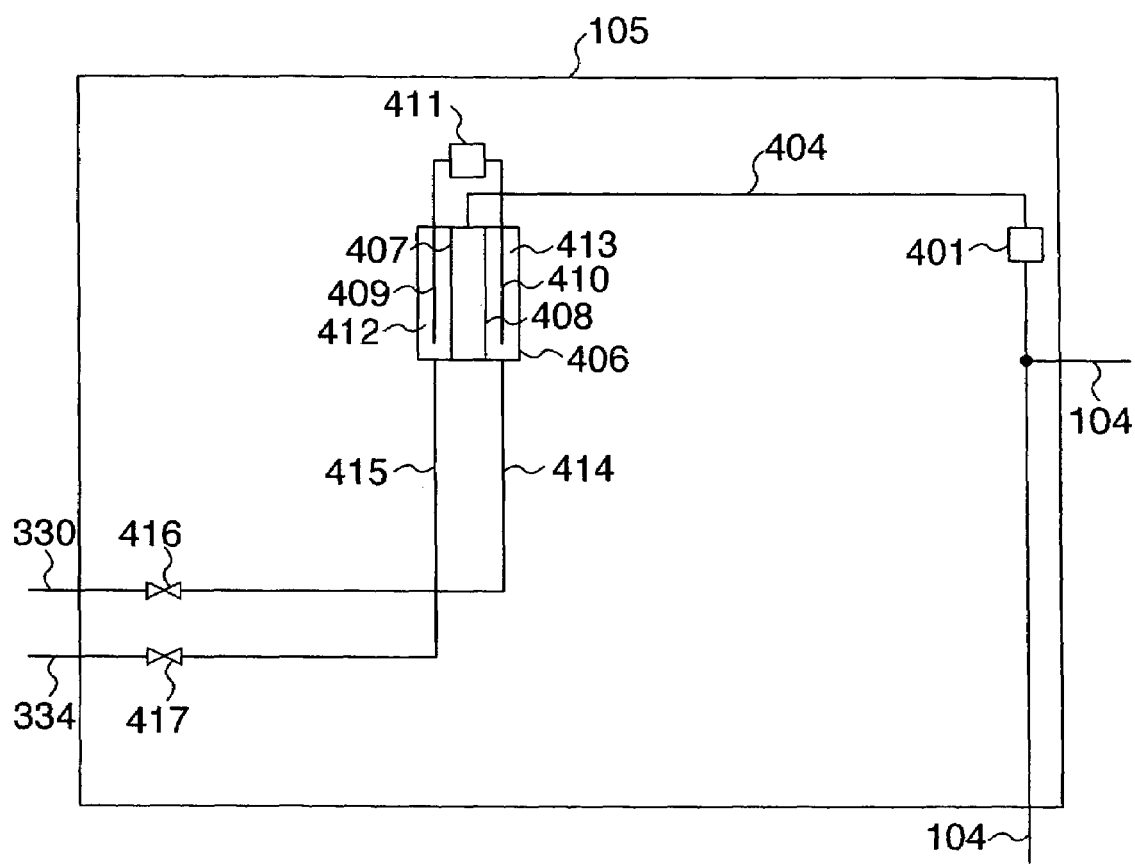
FIG. 6 is a flow diagram of an electrolysis device in the flow of the waste water purification apparatus of the other embodiment according to the invention.

FIG. 6 illustrates the embodiment of another electrolysis apparatus 105 in accordance with the invention. As shown in FIG. 6, the purified water of sea water introduced into the electrolysis apparatus 105 is pressurized by a pump 401 through a pipe 300, and is led into an electrolysis tank 406.

In the electrolysis tank 406, the purified water is introduced into the space between diaphragms 407, 408, and electrolysis is made by supplying electric current from an electric power supply 411 to a positive electrode 409 and a negative electrode 410. Cl ion migrates into the space 412 around the positive electrode 409 through the diaphragm 407, and discharging is made to generate chlorine gas. Accordingly, the space 412 around the positive electrode 409 is saturated with chlorine gas which dissolves into the water to produce HCl and HClO, yielding an acidic aqueous solution.

On the other hand, around the negative electrode 410, OH ions and Na ions are accumulated, with Na ions through the diaphragm 408, generating an alkaline aqueous solution enriched in NaOH in a space 413.

The alkaline aqueous solution enriched in Na ion and OH ion generated in the space 413 is supplied to the sodium hydroxide aqueous solution tank 7b equipped in the seeding agent adjustment apparatus 7 through a pipe 414, a flow regulating valve 416, and the pipe 330 communicatively connected to the outside of the electrolysis apparatus 105.

On the other hand, the aqueous solution generated in the space 412, enriched in H ion, Cl ion and ClO ion, is supplied to the hydrochloric acid aqueous solution tank 7c equipped in the seeding agent adjustment apparatus 7 through a pipe 415, a flow regulating valve 417, and the pipe 334 communicatively connected to the outside of the electrolysis apparatus 105.

The acidic aqueous solution and alkaline aqueous solution, both generated in a manner similar to that in FIG. 4, are mixed in the washing water as alkaline water or acidic water, to be used for improving the washing performance.

As shown in the flow diagram of the FIG. 4 the respective superfluous fractions of the Na(OH) and HCl aqueous solutions are neutralized with each other to yield a salt containing aqueous solution, which is discharged.

According to this embodiment, the electrolysis tank 406 is solely involved in generation of the acidic and alkaline aqueous solutions, with which the coagulant can be regenerated, leading to the effect that the equipment cost can thereby be reduced.

Figure 7:
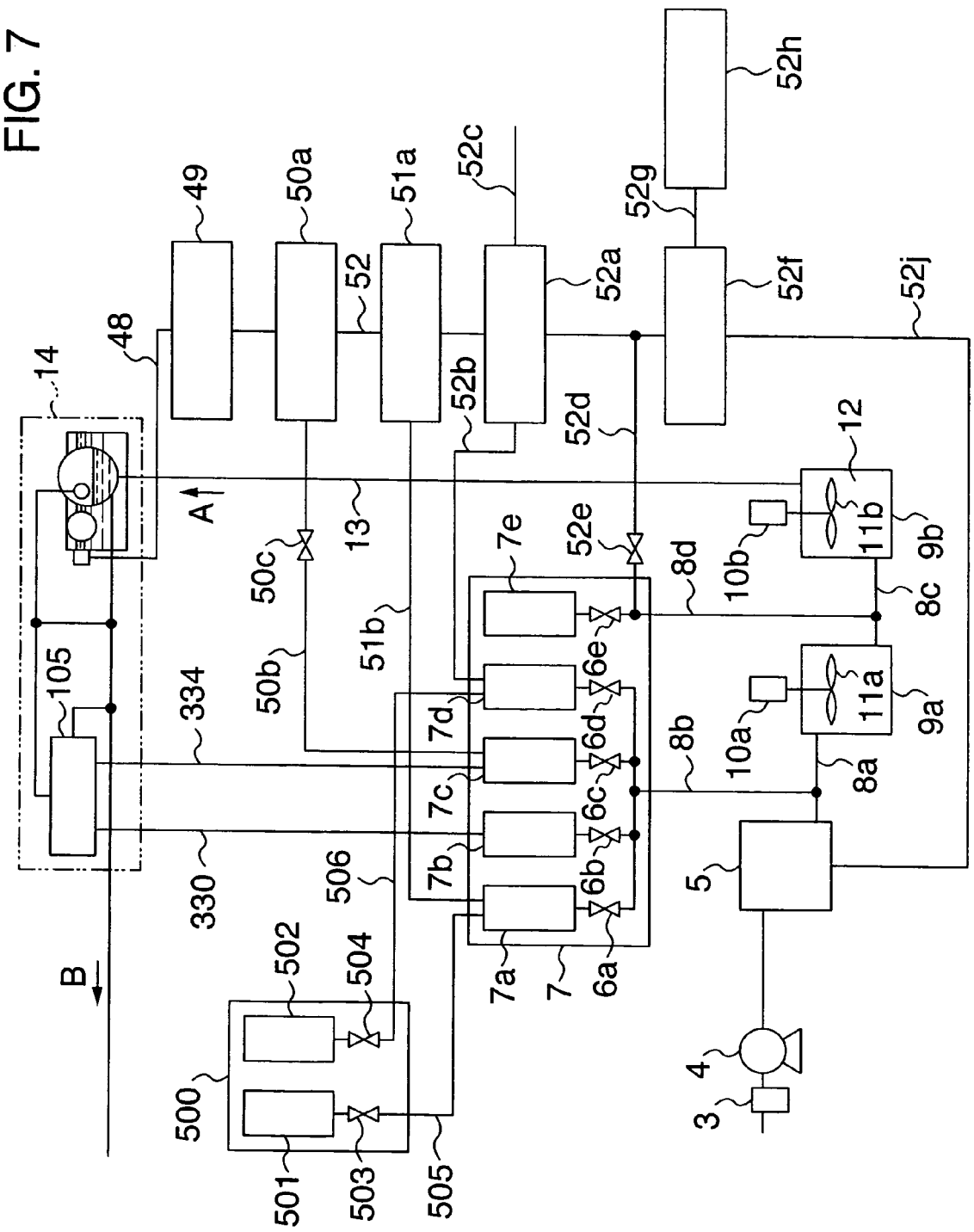
FIG. 7 is a flow diagram showing yet another embodiment of the invention.

Further, FIG. 7 illustrates yet another embodiment in accordance with the invention, and differs from FIG. 1 in that: a fresh chemicals supplying tank 500 is additionally equipped; a magnetic powder slurry tank 501 for supplying fresh magnetic powder and a coagulant tank 502 for supplying fresh coagulant are equipped in the fresh chemicals supplying tank 500; and fresh magnetic powder and fresh coagulant are supplied, when chemicals supply is needed, respectively from the magnetic powder slurry tank 501 and the coagulant tank 502 through pipes 505, 506 with the aid of flow regulating valves 503, 504, for the purpose of making up the deficient amounts determined on the basis of the liquid level information obtained from the level gauges, not shown in the figure, equipped in the magnetic powder slurry tank 7a and coagulant tank 7d, both used for recovery operation, and on the basis of the acidity information obtained from the pH meter equipped in the coagulant tank 7d and other like information. According to this embodiment, for the case where the reuse ratios of the magnetic powder and coagulant do not reach 100%, fresh magnetic powder and coagulant can be resupplied so that the coagulation performance can be maintained over a long period of time. When the coagulant is deficient, resupply of iron ion, by the use of an iron electrode as an electrode in the electrolysis apparatus 105, can help maintain the coagulation performance over a long-term period.

Further, in the above described embodiments, description has been made on the cases where the acidic and alkaline waters, for disintegration and recovery operation of flocs, are generated from electrolysis of sea water; however, generation of the acidic and alkaline waters from soft water also yields similar effects.

As having described above, according to the embodiments, a part of the washing water that is the raw water is led into the electrolysis tank where the acidic and alkaline waters are generated by means of electrolysis; the use of the acidic water permits subjecting the magnetic flocs to disintegration and regeneration treatment in such a way that the magnetic powder is recovered for reuse from the magnetic flocs, and furthermore, metal ion containing water to be coagulant is recovered; and the metal ion containing water can be used as coagulant when used in combination with the alkaline water. Accordingly, resupply of magnetic powder and coagulant is scarcely needed, and the costs for chemicals and costs for transportation of chemicals are almost vanishing, leading to the effect that the operation cost can be reduced. Further, the sludge is disintegrated and the magnetic powder and coagulant are recovered and reused, which leads to the effect that the amount of generated sludge can be reduced.

According to the invention, it is possible to provide a purification apparatus and an operation method therefor, which can regenerate and reuse the coagulant without resupplying the full quantity of an acid/alkali solution, and it is also possible to provide a purification apparatus and an operation method therefor, which can recover oil from the recovered sludge and disinfect the pollutant matters.

It will be further understood by those skilled in the art that the foregoing description has been made on the embodiments of the invention and that various changes and modifications may be made in the invention without departing from the spirit of the invention and the scope of the appended claims.

The invention claimed is:

1. A waste water purification system including a waste water purification apparatus, wherein the waste water purification apparatus comprises:
   purification means for purifying polluted salt water containing matter to be removed including particulate floating particles of plankton, oil particles, and organic matter, and polluted salt water from factory effluent containing matter to be removed, generated from industrial production sites, including pollutant particles and phosphorus;
   sludge recovery means for separating and collecting, from the waste water, sludge generated in purification treatment; and
   means for discharging purified salt water generated in the purification treatment; and
   said purification means and said sludge recovery means comprising:
   coagulation and separation means for forming flocs containing pollutant particles and phosphorus by infusing a coagulant, and for separating the flocs through at least a filtration process of filtering the flocs by a filter to create the purified salt water;
   floc disintegration means for generating an acidic solution and an alkaline solution by electrolyzing part of the purified salt water and for disintegrating the flocs collected as sludge by use of one of the acidic solution and the alkaline solution generated;
   coagulant regeneration means for regenerating the coagulant from matter forming the disintegrated flocs, separating the matter to be removed and the regenerated coagulant in the disintegrated flocs and extracting the coagulant; and
   sludge recovery and discard means for recovering and discarding the matter to be removed.

2. A waste water purification system according to claim 1, wherein said waste water purification apparatus further comprises centrifugal separation means for centrifugally separating and recovering floating particles after the flocs have been disintegrated.

3. A waste water purification system including a water purification apparatus, wherein the waste water purification apparatus comprises:
   purification means for purifying polluted salt water containing matter to be removed including particulate floating particles of plankton, oil particles, and organic matter, and polluted salt water from factory effluent containing matter to be removed, generated from industrial production sites, including pollutant particles and phosphorus;
   sludge recovery means for separating and collecting, from the waste water, sludge generated in purification treatment; and
   means for discharging purified salt water generated in the purification treatment; and
   said purification means and said sludge recovery means comprising:
   coagulation and magnetic separation means for forming magnetic flocs containing pollutant particles and phosphorus by infusing magnetic matter and a coagulant and for separating the flocs through at least a magnetic separation and collection process of magnetically separating and collecting the magnetic flocs by magnetically attracting the magnetic flocs by a magnet to create the purified salt water;
   floc disintegration means for generating an acidic solution and an alkaline solution by electrolyzing part of the purified salt water and for disintegrating the flocs collected as sludge by use of one of the acidic solution and the alkaline solution generated;
   coagulant regeneration means for regenerating the coagulant from matter forming the disintegrated flocs, separating the matter to be removed and the regenerated coagulant in the disintegrated flocs and extracting the coagulant;
   magnetic matter recovery means for recovering the magnetic matter by a magnet; and
   sludge recovery and discard means for recovering and discarding the matter to be removed.

4. A waste water purification system including a waste water purification apparatus, wherein the waste water purification apparatus comprises:
   purification means for purifying polluted water containing matter to be removed including particulate floating particles of plankton, oil particles, and organic matter, and polluted water from factory effluent containing matter to be removed, generated from industrial production sites, including pollutant particles and phosphorus;
   sludge recovery means for separating and collecting, from the waste water, sludge generated in purification treatment; and
   means for discharging purified water generated in the purification treatment; and
   said purification means and said sludge recovery means comprises:

coagulation and separation means for forming flocs the containing pollutant particles and phosphorus by infusing a coagulant, and for separating the flocs to create the purified water;

floc disintegration means for generating an acidic solution and an alkaline solution by electrolyzing the purified water and for disintegrating the flocs collected as sludge by use of one of the acidic solution and the alkaline solution generated;

coagulant regeneration means for regenerating the coagulant from matter forming the flocs, extracting and separating the coagulant from the matter to be removed;

fresh coagulant resupply means for supplying a fresh coagulant when the coagulant is deficient; and sludge recovery and discard means for recovering and discarding the matter to be removed.

* * * * *